G. D. BAIGHTEL.
COMBINED SIDING MARKER AND GAGE.
APPLICATION FILED JUNE 22, 1908.
913,871.
Patented Mar. 2, 1909.
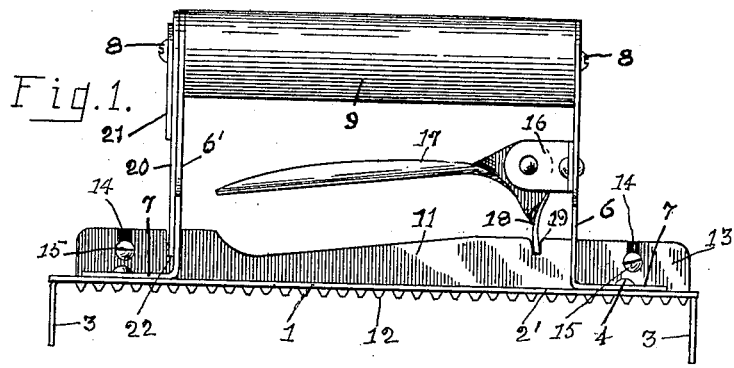
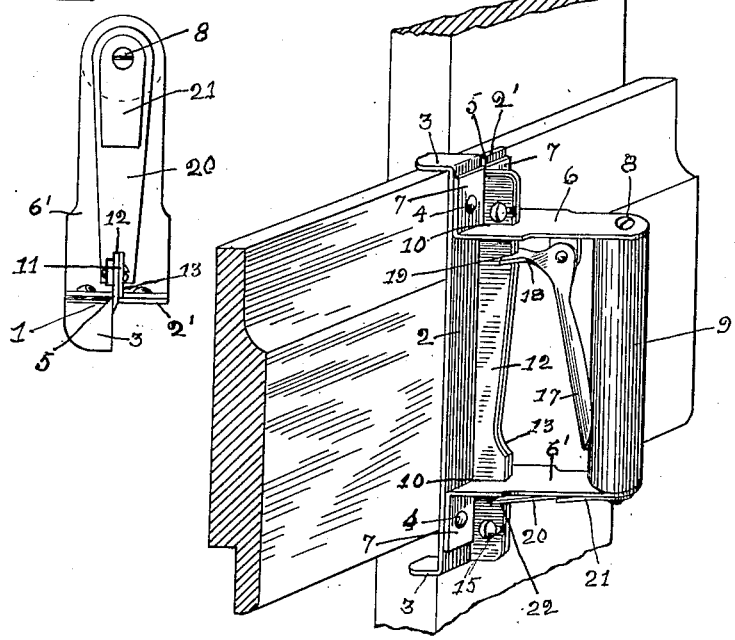
WITNESSES:
D. C. Walter
Fred H. Kruse
INVENTOR.
George D. Baightel
by Robt B Wilson
his Attorney
THE NORRIS PETERS CO., WASHINGTON, D. C.

UNITED STATES PATENT OFFICE.

GEORGE D. BAIGHTEL, OF TOLEDO, OHIO.

COMBINED SIDING MARKER AND GAGE.

No. 913,871.  Specification of Letters Patent.  Patented March 2, 1909.

Application filed June 22, 1908. Serial No. 439,654.

*To all whom it may concern:*

Be it known that I, GEORGE D. BAIGHTEL, a citizen of the United States, residing at Toledo, in the county of Lucas and State of Ohio, have invented a new and useful Improvement in a Combined Siding Marker and Gage, of which the following is a specification.

My invention relates to a combined siding marker and gage and has for its object to provide an implement of the kind for the use of carpenters, that is simple, inexpensive, convenient, and accurate for gaging and marking the exact line for cutting siding for fitting it between casing and corner boards and the like. I accomplish these objects by the construction and combination of parts, as hereinafter described, and illustrated in the drawings, in which—

Figure 1 is a side elevation of a combined siding marker and gage constructed in accordance with my invention. Fig. 2 is an end elevation of the same, and Fig. 3 is a perspective view of the same, showing it applied to gage and mark a siding for fitting it to a window casing or corner board.

In the drawings 1 designates a gage and base, comprising a sheet metal bar 2, having end portions 3 bent at right angles to the main body portion, and forming abutments for engaging a casing or corner board, and a companion base bar 2' of the length of the body or central portions of the bar 2 between the abutments 3.

The bars 2 and 2' are arranged parallel in the same plane, with their adjacent edges separated the thickness of the bars to form a narrow opening 5 the length of the bars. Thus arranged there is secured by rivets 4 a pair of handle supports 6 and 6' formed of sheet metal bars of suitable length, having end portions 7 bent at right angles to the body portions and perforated to receive the rivets 4. The bars 2 and 2' are perforated at a suitable distance from their ends to receive the rivets, and the end portions of the handle supports 6 and 6' are of a suitable width to extend over both the bars 2 and 2', with the outer edges of the portions 7 coinciding with the outer edges of the bars 2 and 2', to each of which, they are secured by the rivets 4 through perforations in the portions 7, adapted to register with the perforations of the bars 2 and 2'.

The handle supports at their free end portions are preferably reduced in width and rounded at their free ends, and central of the circle of their ends they are perforated to receive screws 8, which extend into the ends of a handle 9.

Opposite the openings 5, and registering therewith along the inner edge of the bar 2, the handle supports 6 and 6' are provided with incuts 10 which are twice the width of the opening 5, and extend through the portions 7 and a suitable distance into the main body portions of the handle supports, to receive a marker blade 11, comprising the toothed saw plate 12, and the coinciding supporting plate 13. The saw plate 12 is wider than the plate 13, and its toothed edge extends through the opening 5 between the bars 2 and 2', with the teeth of the saw plate extending slightly beyond the faces of the bars opposite to the faces to which the handle supports are secured. The supporting plate 13 rests on the bar 2' flush with its inner edge, and in its end portions are provided incuts 14 which extend downward from its top edge to receive adjusting screws 15—which are threaded into suitably threaded orifices through the saw plate 12, whereby the saw plate is adjustably secured to the supporting plate 13.

The handle support 6 is provided on its inner face with an ear 16 to which is pivoted a bell crank lever, having a long arm 17, formed as a grip handle and extending along the handle 8, and a short arm 18, which extends toward the marker blade 11 and into registering incuts 19 in the top edges of the saw plate 12 and the supporting plate 13.

To the outer side of the handle support 6' is provided a plate spring 20, which is perforated at its outer end to receive the screw 8 of that support, and outside of the spring the screw also secures a washer plate 21. The inner end portion of the spring 20 extends into registering incuts 22 in the saw plate 12 and the supporting plate 13 of the marker blade 11.

Thus constructed the implement is applied to gage and mark a siding to make a fitting joint between a casing and corner board, or between either and a siding joint, by placing the siding in position, with one end forming the joint which it is to make at that end, and holding the board overlapping the casing or corner board with one hand, and the implement by the handle 9 with the other hand, and placing the base 1 across the siding, with the inner edges of the abutments 3 against the edges of the corner board or casing with which the siding is to be joined, (as shown in Fig. 3). In this position the marker blade is reciprocated across the board, by alternately drawing the handle 17 of the bell crank lever with the fingers of the hand holding the handle 9 of the implement towards the handle and then releasing it, the spring 20 operating to return the marker blade to its normal position after it has been moved therefrom by the handle 17, and repeating these movements, until a mark has been made across the siding by the teeth of the marker blade. The siding when cut along this mark will closely fit between the casing or corner board and the siding end, corner board or casing against which the opposite end was abutted when the mark was made.

By the use of a combined marker and gage constructed in accordance with my invention as described, the use of nails to secure the siding in position for marking, and the damage to the siding that frequently occurs therefrom, is wholly avoided, and the work of fitting the siding to casing and corner boards is greatly reduced, and greater accuracy of fit is secured.

What I claim to be new is:—

1. In a combined siding marker and gage, a base having a narrow lengthwise opening, and end abutments flush with one side of the opening, a marker blade having a cutting edge extending through and movable lengthwise of the opening, handle supports secured to the base on opposite sides of the marker blade and forming guides for the blade, a handle secured to the supports, and means to reciprocate the marker blade, adapted to be operated by the hand grasping the handle while holding the base across a siding with the abutments engaging the face of a casing or corner board to which the siding is to be fitted, substantially as set forth.

2. In a combined siding marker and gage, a base having a narrow lengthwise opening and end abutments flush with one side of the opening, a marker blade having a cutting edge extending through and movable lengthwise of the opening, means to support the blade on the base with the cutting edge extending through the opening, guides for the blade mounted on the base and forming handle supports, a handle for the base secured to the handle supports, a bell crank pivoted to a handle support, having a short arm engaging the marker blade, and a longer arm extending between the handle and the blade and adapted to be grasped along with the handle and moved toward the handle, and thereby move the blade in one direction through the opening, a spring engaging the blade and adapted to be flexed by the movement of the blade by the long arm of the bell crank when moved towards the handle, and to move the blade in the opposite direction when the pressure on the bell crank is relaxed, substantially as set forth.

3. A combined siding marker and gage, comprising a gage base formed of two rectangular strips of sheet metal secured parallel in the same plane to handle supports, with a narrow intervening opening between the strips, one of the strips having end portions bent to form abutments flush with one side of the opening, and the handle supports having guide slots opposite the opening between the strips, a marker blade extending through the guide slots of the handle supports, and having a toothed edge extending through the base opening and provided with a sliding support engaging the base, a handle secured to the handle supports, a bell crank pivoted to a handle support and having one arm engaging the marker blade and the other arm adapted to be grasped along with the handle, and a spring engaging the marker blade and adapted to coöperate with the bell crank to produce a reciprocation of the marker blade.

In witness whereof, I have hereunto signed my name in the presence of two subscribing witnesses, this fourth day of June, 1908.

GEORGE D. BAIGHTEL.

In presence of—
MARK WINCHESTER,
W. J. BILLINGSLEA.